Jan. 22, 1963   B. E. COOPER   3,075,144
TUBE WALL THICKNESS TESTING APPARATUS
Filed July 10, 1959   2 Sheets-Sheet 1

INVENTOR.
BERT E. COOPER
BY
Horace B. Van Valkenburgh
ATTORNEY

United States Patent Office 3,075,144
Patented Jan. 22, 1963

3,075,144
TUBE WALL THICKNESS TESTING APPARATUS
Bert E. Cooper, Torrington, Wyo., assignor to Holly Sugar Corporation, Colorado Springs, Colo., a corporation of New York
Filed July 10, 1959, Ser. No. 826,348
7 Claims. (Cl. 324—34)

This invention relates to apparatus for testing the wall thickness of tubing, such as tubes of evaporators, calorizators, condensers, and the like, and more particularly to apparatus for testing the wall thickness of non-magnetic tubing, such as copper, brass and the like.

The tubing in evaporators used in the concentration of certain liquors, such as in the processing of sugar, requires periodic checking and replacements to avoid the necessity of shutting down the equipment during use when leakage occurs. Since a reduction in wall thickness which will result in ultimate failure is usually the result of wear over a considerable portion of the tube, although the maximum wear may sometimes be localized, it has been the usual practice to remove and replace all tubes periodically. However it has been found that many of the tubes replaced are still serviceable and were not in need of replacement, which makes the maintenance of the tube evaporators unduly expensive, due to the cost of replacement tubes. Of course, if all the tubes were removed for inspection and only those tubes requiring the same were replaced, the labor costs would be unduly high and the total cost would usually exceed the cost of replacing all tubes periodically. Tubes in other types of equipment, such as calorizators, heaters, condensers and other equipment, are also subject to wear and should be replaced when worn to the point of probable failure within a time corresponding to the next inspection period. Thus, such tubing involves similar problems and also is usually formed of copper, brass or other non-magnetic material having a high rate of heat conductivity.

Among the objects of the present invention are to provide an improved apparatus for testing the wall thickness of non-magnetic tubing; to provide such apparatus by which such tubes may be examined to determine the presence of areas wherein the wall thickness has decreased sufficiently that replacement is advisable; to provide such apparatus by which the relative thickness of non-magnetic tubing can be determined throughout the length of the tubing without removal of the tubing from the equipment; to provide such apparatus which is easily portable and can be moved to the equipment; to provide such apparatus which can be operated from a normally available power source and thus does not require a special generator or other special power source; to provide such apparatus which includes a meter which will give a direct reading corresponding to the average cross sectional area of the tube at different locations; to provide such apparatus which is reliable in operation; and to provide such apparatus which is sufficiently simple in construction that it may be readily manufactured.

In accordance with the present invention, a wall thickness testing apparatus for non-magnetic tubes includes a probe adapted to be inserted within a tube to be tested and having a pair of axially aligned cores formed of magnetic material and connected by a spacer formed of non-magnetic material, and a coil wound on each core with the first coil having a resistance which is a large multiple of the resistance of the second coil. A source of alternating current is connected across the first coil, a direct current meter is connected across the second coil and a rectifier is connected in series with the meter. The circuits of the two coils may be interconnected through a zero adjustment potentiometer, while additional resistances and an additional potentiometer, located at desirable places, may be used.

The present invention, together with additional objects and the novel features thereof, will more readily be understood from the following description, taken in connection with the accompanying drawings, in which.

Figure 1:
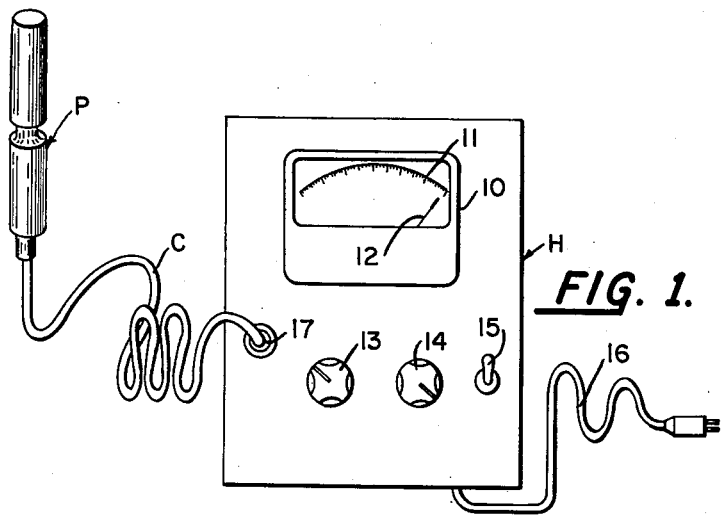
FIG. 1 is a top plan view of apparatus constructed in accordance with this invention, shown in position prior to testing.

As illustrated in FIG. 1, a device of the present invention comprises a probe P which is physically and electrically connected by a cable C to a housing H in which is installed a D.C. meter 10 having a scale 11 and a pointer 12, a pair of control knobs 13 and 14, and an off-on switch 15, the parts within housing H being connected to a 110 volt source of A.C., by a conventional cord 16. The cable C is a four conductor cable and is connected to the housing by a four prong locking plug 17. As will be evident from FIG. 3, probe P is adapted to be inserted within the upper end of a vertical tube 19 and lowered within the tube while readings are taken on meter 10. In the event that the tube is inclined to the horizontal, the probe P can be inserted from the upper end and permitted to slide down the tube by cable C. However, if the probe is to be inserted in a horizontal tube, or into the lower end of a vertical tube or a tube inclined to the horizontal, a supporting rod of sufficient length and formed of non-magnetic material, such as brass, may be used in a manner described later.

Figure 3:
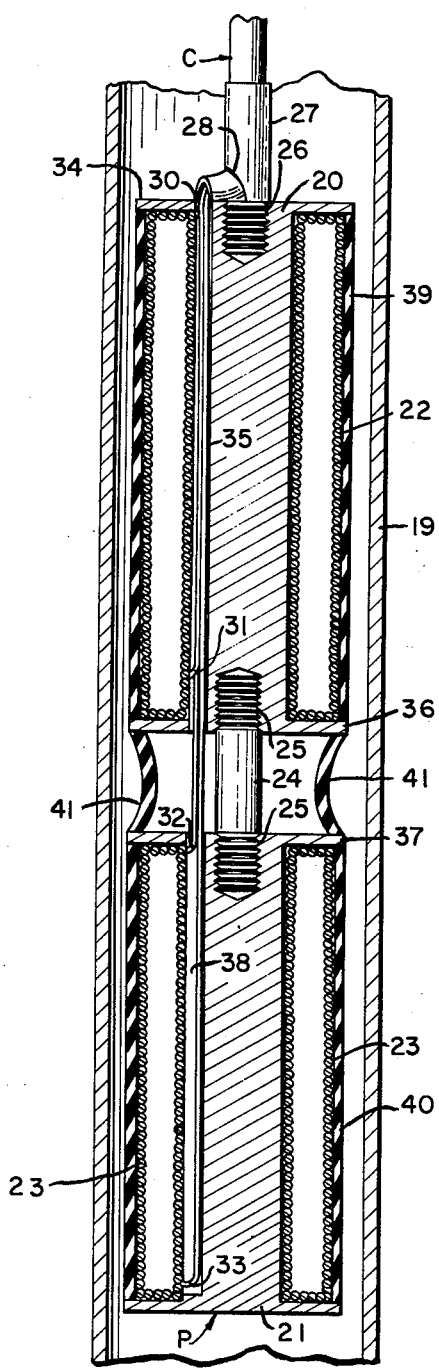
FIG. 3 is a fragmentary, longitudinal cross section of a probe of the present invention, within a tube whose wall thickness is being measured.

Referring to FIG. 3, probe P comprises a pair of axially aligned, spaced cores 20 and 21, respectively, formed as spools and of magnetic material, such as mild steel, on which coils 22 and 23 are respectively wound, coil 22 having a resistance which is a large multiple of the resistance of coil 23. Core spools 20 and 21 are spaced axially and mechanically secured in spaced relation by a spacer 24 of non-magnetic material, such as brass, which may be threadedly attached to cores 20 and 21, as by means of threads 25 engaging threaded sockets in the adjacent ends of cores 20 and 21, to provide for adjustment, if necessary, of one coil with respect to the other. At its upper end, core 20 may be provided with a threaded socket to receive threads 26 of a tubular sleeve 27 into the end of which cable C extends and out through a side opening 28. Cable C is provided with four conductors, i.e., conductors 30, 31, 32 and 33, which pass through a hole in the adjacent flange 34 of core 20 for connection of conductor 30 to one end of coil 22. Conductors 31, 32 and 33 lay in a slot 35 in core 20 for passage to the opposite end of the core and connection of conductor 31 to the opposite end of coil 22, with conductors 32 and 33 extending through a hole in flange 36 and alongside spacer 24 to a hole in flange 37 of core 21. Conductor 32 is there connected to one end of coil 23, while conductor 33 lays in a slot 38 in core 21 for passage to and connection with the opposite end of coil 23. Coil 22 may be covered with insulation 39, such as tape, and coil 23 with similar insulation 40, while insulation 41, as of tape, may be wound about spacer 24 between the cores. When probe P is to be inserted in a horizontal tuze, or upwardly into a tube other than horizontal, the threaded end of a rod of suitable length and formed of non-magnetic material, such as brass, may be threaded into the socket in core 20 in lieu of sleeve 27 and cable C taped to the rod at spaced positions. As will be evident, probe P will be supported by the rod for horizontal or upward movement within the tube. As will be evident, the head only of an evaporator, calorizator, heat exchanger, condenser, or the like needs to be removed to obtain access to one end of the tube for test purposes. This tubes which require replacement can be marked, but only if one or more tubes need to be replaced is it necessary to obtain access to the opposite tube sheet.

Figure 2:
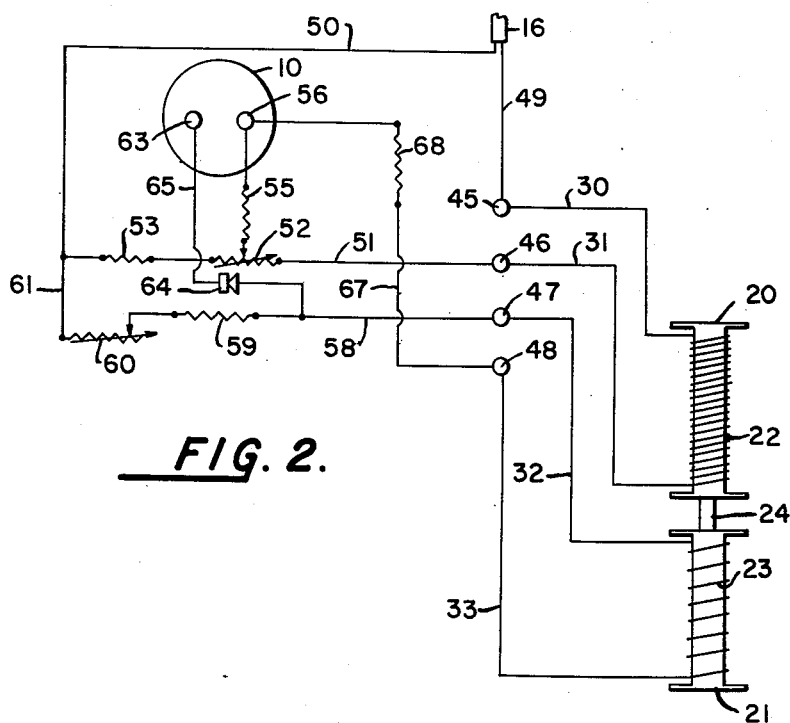
FIG. 2 is an electrical circuit diagram showing the preferred connection of parts of the present invention.

Referring now to FIG. 2, the opposite ends of coil 22 are connected to terminals 45 and 46 of plug 17 by conductors 30 and 31, respectively, while the opposite ends of coil 23 are connected to terminals 47 and 48 of plug 17 by conductors 32 and 33, respectively. One end of coil 22, which for the purpose of this description shall be referred to as the primary coil, is connected by conductor 30 and terminal 45 of plug 17 to a wire 49 of cord 16 which is one side of a source of alternating current, such as 110–120 volt, 60 cycle. The other end of primary coil 22 is connected to a wire 50 of cord 16, forming the other side of the alternating current source, via conductor 31, terminal 46 of plug 17, a wire 51, and serially through the resistance element of a potentiometer 52 and a resistor 53, potentiometer 52 being used to adjust for differences in line voltage. The sliding tap of potentiometer 52, adjusted by knob 12 of FIG. 1, is connected serially through resistor 55 to terminal 56 of meter 10. One end of coil 23, which for the purpose of this description shall be referred to as the secondary coil, is connected to one side of the alternating current source, i.e., wire 50, via conductor 32, terminal 47 of plug 17, a wire 58 and serially through resistor 59, a rheostat 60, which may be adjusted by knob 13 of FIG. 1, and a wire 61. Rheostat 60 may be used to adjust for differences in line voltage also, as well as to adjust for changes in the resistance of the circuit due to heating. This same end of the secondary coil is further connected to terminal 63 of meter 10 serially through meter rectifier 64, connected to wire 58, and a wire 65. The other end of the secondary coil is connected to terminal 56 of meter 10 via conductor 33, terminal 48 of plug 17 and serially through a wire 67 and resistor 68.

As an illustrative example, in a probe used to test wall thickness of brass tubes having a 1¼ inch to 1½ inch O.D. and larger, coil 22 in one instance was formed of No. 35 A.W.G. enamel insulated copper wire having a length to provide a total resistance of approximately 650 ohms, while coil 23 was formed of No. 20 A.W.G. enamel insulated copper wire wound in the same direction, and having a length to provide a total resistance of approximately 3 ohms. In an earlier model, coil 22 was formed to provide a total resistance of approximately 575 ohms, while coil 23 was formed to provide approximately 1 ohm. Thus, it has been found that the resistance of the primary coil should be a relatively large multiple of the resistance of the secondary coil, such as a ratio of resistance between the primary coil and the secondary coil in the range of from about 575:1 to about 200:1. It was also found to be essential for the satisfactory operation of the device of this invention that spacer 24 be formed of a non-magnetic material, while the spacing between the coils was also found to be critical. Thus, when the core 20 for the primary coil had a 1 3/16 inch O.D. and a ½ inch I.D., being 1¾ inches between flanges in length and the core 21 for the secondary coil had a 1 3/16 inch O.D. and a ½ inch I.D., being 1⅝ inches in length between flanges, a spacing between the cores of not less than about ⅝ inch and not more than about ¾ inch was found to be necessary for effective operation.

The test apparatus of the invention was found to be sensitive to changes of 0.002 inch in wall thickness. For testing other size tubes, modification of the probe dimensions and coil characteristics in accordance with the above teaching may be required to achieve the requisite effective utility.

Meter 10 in the embodiment described was 250 microammeter with the magnetic field of the meter reversed, so that the pointer stood at full scale when disconnected from the circuit, as shown in FIG. 1. The dial was graduated from 0 to 250 in sixty graduations, with each graduation representing 4.16 microamperes. In the circuit of FIG. 2, the resistance element of potentiometer 52 had a total resistance of 175 ohms, while resistor 53 was 400 ohms and resistors 55 and 68 were 75 ohms. Resistor 59 was 2000 ohms, while rheostat 60 had a total resistance of 2500 ohms. Rectifier 64 was a "Conant" No. 4 instrument rectifier.

In operation, the improved testing apparatus of this invention is connected to an appropriate alternating current source. Potentiometer 52 is adjusted, along with rheostat 60 to give a zero meter reading with the probe in air. It may, in certain instances due to variations in line voltage, be impossible to zero the meter and it may be necessary to raise the normal meter range of 0–200 to 25–225, for instance, but since the test results are based on changes in the meter reading, this presents no problem. An initial reading is made on a tube of the diameter to be tested and having a known wall thickness. A reading on the meter is obtained, for example, of 150 microamps. The probe is then inserted into the tubes of the equipment. If the meter reading drops considerably, as from 50 to 100 microamps., below the reading obtained on the standard tube, one of the lowest reading tubes is removed and cut to determine the thickness of the walls at the point of lowest reading. This measurement serves as a guide in checking the balance of the tubes.

Where a standard tube is unavailable, an old tube sample can be employed, or the probe inserted into a number of the equipment tubes, a tube giving the lowest reading removed, cut and measured. If in passing the probe throughout the length of a tube the meter reading remains constant, it is an indication that the cross sectional area of the tube is substantially constant. The initial reading of the meter will differ when inserted in different sized tubes. For example, the probe used for 1¼ inch and 1½ inch tubes has been used successfully to measure tubes 2 inches in diameter, while movement of the probe from side to side within the 2 inch tube produced very little variation in the meter reading. It was found that relatively small holes would not produce a significant change in the meter reading; however, if the tube were split for any length, destroying the continuity of the tube surrounding the probe, a zero meter reading was obtained.

During use, it is advisable to check the reading of the meter periodically against the standard. Changes in line voltage or heating effects on the coils will result in different readings. If the reading on the standard was 150 microamps. initially, for instance, and a recheck reading of 120 microamps. is obtained, the circuit should be readjusted to give a meter reading of 150 microamps. on the standard, disregarding zero until all of the tubes on a particular piece of equipment have been checked.

It will be seen that the present invention fulfills all of the objects sought to be accomplished. Considerable savings have been realized from the use of the testing apparatus of this invention, in reduced shut-down time and unnecessary replacement of tubes. One piece of equipment having all new tubes was checked periodically with the device of this invention and the tubes which ultimately failed were accurately predicted from the accumulated data.

The theory of operation of the invention is not completely understood; however, it is believed that it functions on a feed back or phase shift principle, with a greater wall thickness producing a correspondingly greater flow of current in the secondary coil as indicated on the meter. It is to be understood that applicant is not to be held to the above theory to explain the operation of the invention, should the principle of operation be found to differ, in fact, from applicant's belief.

While there has been described what at present is con-

What is claimed is:

1. Apparatus for testing the tube wall thickness of non-magnetic material, comprising a probe adapted to be inserted within the tube and having a pair of axially aligned cores, a non-magnetic spacer extending between said cores, coil means wound on each core with the first coil means having a total resistance many times the second coil means; means connecting said first coil means across a source of alternating current; meter means; a potentiometer connected between one side of said first coil means and one side of the alternating current source with the sliding tap thereof being connected to a first terminal of said meter means; means connecting one end of said second coil means to said first terminal of said meter, the other end of said second coil means being connected to said one side of the alternating current source; and rectifier means connected between said other end of said second coil means and a second terminal of said meter means.

2. Apparatus for testing the wall thickness of tubes formed of non-magnetic material, comprising a probe adapted to be inserted within a tube to be tested, having a pair of axially aligned, spaced cores and coil means wound on each core; a source of alternating current, one side of which is connected to one end of one coil; a direct current meter, a first terminal of which is connected to one end of the other coil; means connecting the opposite side of said source to the opposite end of said one coil through a potentiometer, the movable contact of which is connected to said first terminal of said meter; means including a wire connecting said other side of said source to the opposite end of said second coil; and rectifier means connected between said wire and a second terminal of said meter.

3. Testing apparatus as set forth in claim 2, wherein each of said coil means has a different number of turns.

4. Testing apparatus according to claim 2, wherein a non-magnetic spacer extends between said cores to maintain a predetermined axial spacing between said coil means.

5. Testing apparatus as set forth in claim 2, wherein the axial spacing between said cores is maintained between about 5/8 inch and about 3/4 inch.

6. Testing apparatus as set forth in claim 3, wherein one coil is provided with a resistivity many times the resistivity of the other coil.

7. Testing apparatus according to claim 6, wherein the ratio of resistance between one said coil and the other said coil is on the order of from about 220 to 1 to about 575 to 1.

References Cited in the file of this patent

UNITED STATES PATENTS

| | | |
|---|---|---|
| 2,065,118 | Davis | Dec. 22, 1936 |
| 2,219,708 | Kruse | Oct. 29, 1940 |
| 2,337,231 | Cloud | Dec. 21, 1943 |
| 2,540,588 | Long | Feb. 6, 1951 |
| 2,573,799 | McLean | Nov. 6, 1951 |
| 2,629,004 | Greenough | Feb. 17, 1953 |
| 2,698,920 | Gieske | Jan. 4, 1955 |
| 2,844,787 | McCann | July 22, 1958 |
| 2,946,026 | Rollefson | July 19, 1960 |